(12) United States Patent
Kim

(10) Patent No.: US 8,723,808 B2
(45) Date of Patent: May 13, 2014

(54) MOBILE TERMINAL INCLUDING TOUCH ROTARY DIAL DISPLAY

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 849 days.

(21) Appl. No.: 12/025,527

(22) Filed: Feb. 4, 2008

(65) Prior Publication Data

US 2008/0204423 A1    Aug. 28, 2008

(30) Foreign Application Priority Data

Feb. 28, 2007 (KR) .................. 10-2007-0020278

(51) Int. Cl.
*G06F 3/041* (2006.01)

(52) U.S. Cl.
USPC .......................................... 345/173

(58) Field of Classification Search
None
See application file for complete search history.

(56) References Cited

U.S. PATENT DOCUMENTS

| | | | | |
|---|---|---|---|---|
| 1,472,595 | A * | 10/1923 | Hillhouse ................ | 379/366 |
| 5,559,301 | A * | 9/1996 | Bryan et al. .............. | 84/653 |
| 5,886,697 | A * | 3/1999 | Naughton et al. ........... | 345/473 |
| 5,943,050 | A * | 8/1999 | Bullock et al. ............. | 715/783 |
| 6,400,807 | B1 * | 6/2002 | Hewitt et al. .............. | 379/88.11 |
| 6,448,987 | B1 * | 9/2002 | Easty et al. ............... | 715/834 |
| 2003/0048262 | A1 * | 3/2003 | Wu et al. .................. | 345/173 |
| 2004/0067778 | A1 | 4/2004 | Sata et al. | |
| 2006/0033723 | A1 | 2/2006 | Maw | |
| 2007/0152979 | A1 * | 7/2007 | Jobs et al. ................ | 345/173 |

FOREIGN PATENT DOCUMENTS

| | | |
|---|---|---|
| JP | 63-226716 A | 9/1988 |
| JP | 2004-64269 A | 2/2004 |
| JP | 2006-252322 A | 9/2006 |
| KR | 10-2003-0003598 A | 1/2003 |
| KR | 10-2006-0131152 A | 12/2006 |
| TW | I273467 B | 2/2007 |
| WO | WO 2007/078477 A1 | 7/2007 |
| WO | WO 2007/082140 A1 | 7/2007 |
| WO | WO 2009/100018 A2 | 8/2009 |

* cited by examiner

*Primary Examiner* — David D Davis
(74) *Attorney, Agent, or Firm* — Birch, Stewart, Kolasch & Birch, LLP

(57) ABSTRACT

A method of executing a function through a touch input device. The method includes displaying a plurality of soft keys on a screen of the touch input device, and executing a function when one of the soft keys is touched and slid on the screen of the touch input device and an input instruction is entered to execute the assigned function.

19 Claims, 16 Drawing Sheets

MOBILE TERMINAL INCLUDING TOUCH ROTARY DIAL DISPLAY

This application claims priority to Korean Patent Application No. 10-2007-0020278 filed on Feb. 28, 2007, the entire contents of which is hereby incorporated by reference in its entirety.

BACKGROUND OF THE INVENTION

1. Field of the Invention

This present invention relates to a mobile terminal and corresponding method that displays an analog-type dial on a touch screen of the mobile terminal.

2. Description of the Related Art

Mobile terminals now provide many addition functions besides the basic call service. For example, users can now access the Internet, send and receive voice and text messages, play music, watch videos, perform scheduling tasks, etc. Most young people today now consider a mobile terminal a necessity. However, older people often only want a mobile terminal to perform basic call functions and are not interested in sending text messages, downloading music, etc. Further, because of the complexity of cell phones, many older people do not own cell phones.

SUMMARY OF THE INVENTION

Accordingly, one object of the present invention is to address the above-noted and other problems.

Another object of the present invention is to provide a mobile terminal that is easy to operate for older people.

Still another object of the present invention is to provide a nostalgic telephone dial on a touch screen of the terminal.

To achieve these and other advantages and in accordance with the purpose of the present invention, as embodied and broadly described herein, the present invention provides in one aspect A method of executing a function through a touch input device. The method includes displaying a plurality of soft keys on a screen of the touch input device, and executing a function when one of the soft keys is touched and slid on the screen of the touch input device and an input instruction is entered to execute the assigned function.

In another aspect, the present invention provides a mobile terminal including a touch screen display configured to display a plurality of soft keys, and a controller configured to execute a function on the terminal when one of the soft keys is touched and slid on the touch screen display of the touch input device and an input instruction is entered to execute the assigned function.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Figure 1:
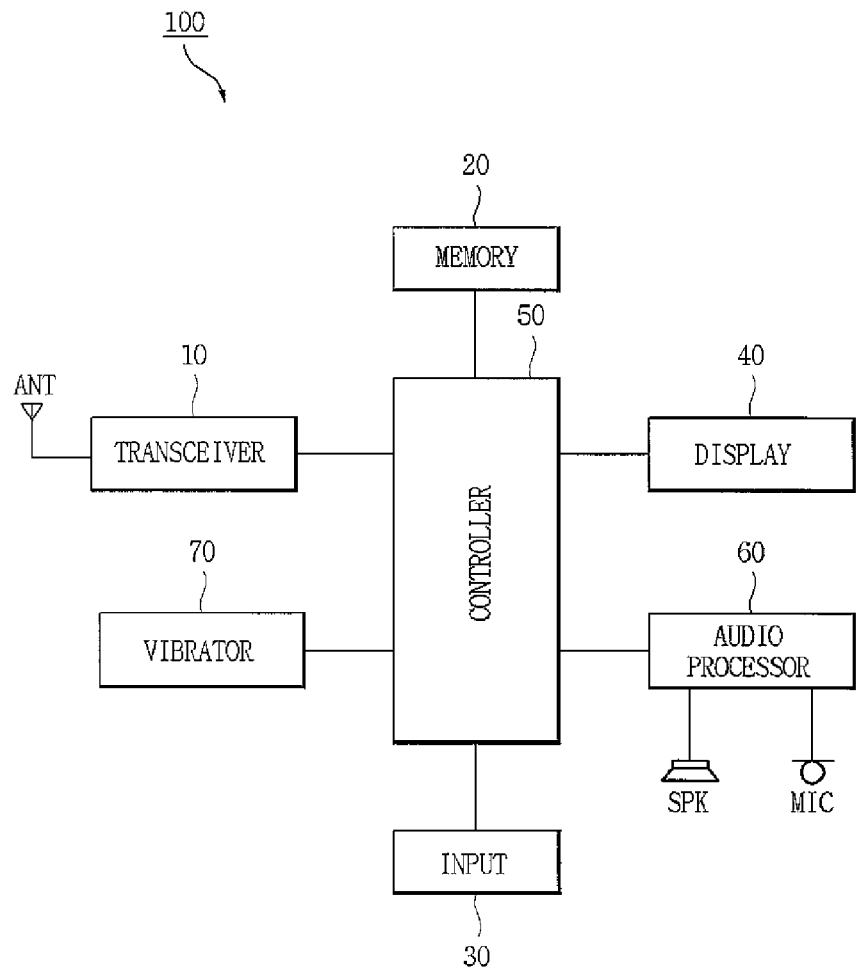
FIG. 1 is a block diagram of a mobile communication terminal according to an embodiment of the present invention.

Reference will now be made in detail to the preferred embodiments of the present invention, examples of which are illustrated in the accompanying drawings. The same reference numerals will be used to describe the same or similar elements.

FIG. 1 is a block diagram of a mobile communication terminal 100 according to an embodiment of the present invention. As shown in FIG. 1, the mobile communication terminal 100 includes a transceiver 10, a memory 20, an input 30, a display 40, a controller 50, an audio processor 60 and a vibrator 70.

The transceiver 10 transmits and receives signals with a base station (not shown) to perform a communication function for the mobile communication terminal 100. Further, the memory 20 stores programs for controlling an overall operation of the terminal 100, and various data input, output and processed during the operations of the mobile communication terminal 100. The memory 20 may also store abbreviated numbers for performing functions such as connecting a call to a phone number corresponding to the selected abbreviated number (i.e., speed dialing functions). The memory 20 may also store various menus for setting a standby screen, background screen, ring tone, etc.

In addition, the input 30 includes various buttons for inputting information such as numbers and characters. The input 30 also includes function buttons for selecting various functions and direction buttons for selecting a specific direction. Further, the input 30 may be implemented as a keypad, a touchpad, a jog dial, a touch screen, or a joystick, which includes direction keys.

The display 40 displays a variety of information such as status information, menu options for selecting different features on the terminal 100, etc. In addition, the display 40 may include a Liquid Crystal Display (LCD) or an Organic Light Emitting Diode (OLED) display. The display 40 may also include two or more display devices such as an external display device and an internal display device. Further, the display device may include a touch screen that a user can touch to select or input information into the terminal 100. The touch screen also displays various information to the user. Hereinafter, the reference numeral 40 is used to describe a touch screen, which is implemented as the display 40.

Also, according to an embodiment of the present invention, the touch screen 40 also displays a dial that the user can touch and drag (or slide) to perform a dialing operation. That is, the displayed dial includes a rotary dial that the user can dial to perform a dialing operation. Further, the displayed dial may also be used by the user to perform other functions in addition to the dialing operation. These features will be discussed in more detail later.

The controller 50 includes a processor that controls an overall operation of the terminal 100 based on the programs and data stored at the memory 20. For example, the controller 50 receives an input of a specific number key when the user touches a specific number key or position on the touch screen 40. The controller 50 also executes a specific function corresponding to specific number keys the user touches and slides or drags.

In addition, the audio processor 60 processes audio signals decoded by the controller 50 and outputs the signals via a speaker SPK under control of the controller 50. The audio processor 60 also processes audio signals from a microphone MIC and transmits the processed audio signals to the controller 50.

In addition, the vibrator 70 generates a vibration for a predetermined time period under control of the controller 50. For example, if a specific soft key displayed on the display 40 is touched, the controller 50 may control the vibrator 70 to generate a vibration for a predetermined time period. The vibrator 70 may also vibrate when an incoming call is received so as to notify the user about the incoming call. A description of the rotary dial being displayed on the touch screen 40 and being used to perform dialing and other operations will now be described.

Figure 2A:
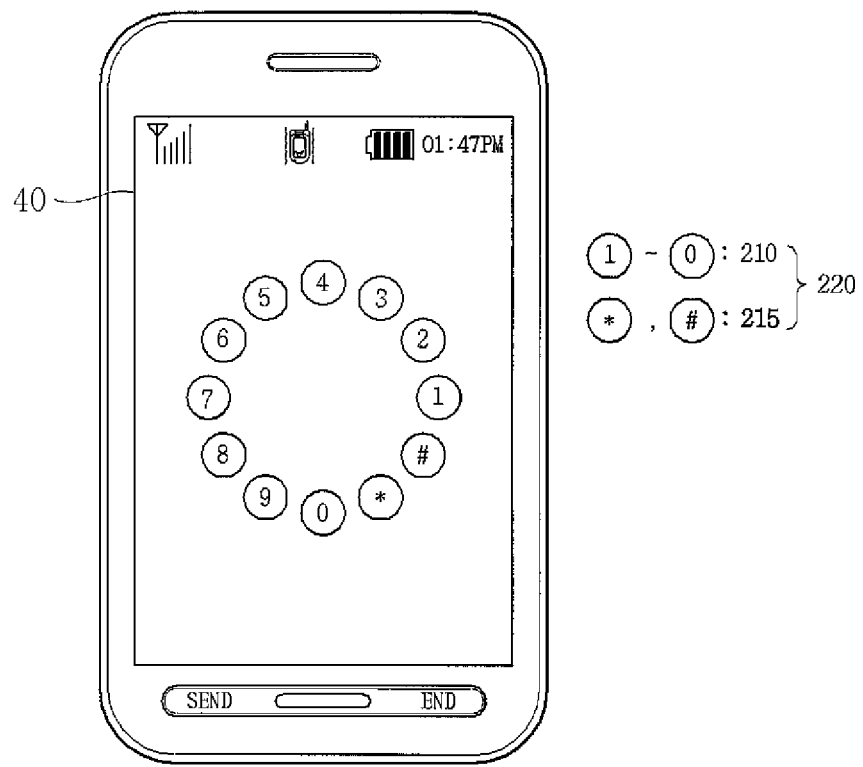
FIGS. 2A and 2B are overviews illustrating different rotary dials according to an embodiment of the present invention.

In more detail, FIGS. 2A and 28 are overview illustrating rotary dials being displayed on the touch screen 40 according to an embodiment of the present invention. As shown, in FIG. 2A, a rotary dial including soft keys 220 is displayed on the touch screen 40. As shown, the soft keys 220 include number keys 210 from "0" to "9", and function keys 215, for example, "*" and "#". Alternatively, the soft keys 220 may include only the number keys 210 without the function keys 215.

In addition, the soft keys 220 are displayed along the peripheral of a circle (i.e., as a rotary dial). Also, each of the soft keys 220 is separated a predetermined distance from each other such that the user can easily touch and slide or drag a particular soft key 220. Further, it also possible to display the soft keys 220 in an oval or a looped curve shape.

Figure 2B:
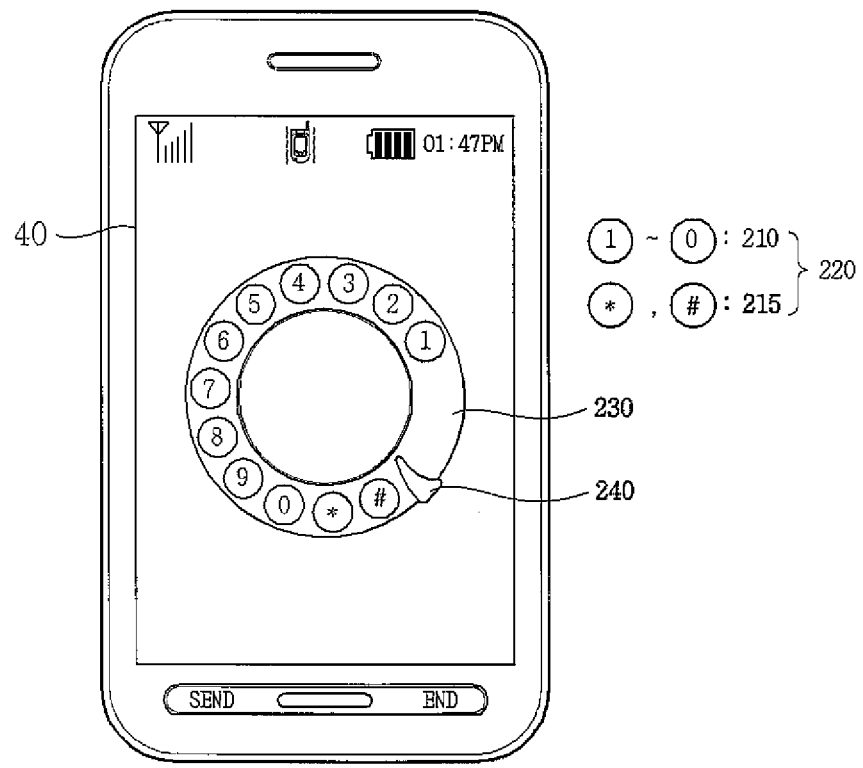

FIG. 2B illustrates a different arrangement of the soft keys 220. That is, FIG. 2B illustrates the soft keys 220 shown in FIG. 2A, but also displays an outline of a rotary dial casing 230. The rotary dial also includes a stopper 240 displayed at an outer periphery adjacent to the function key 215. The rotary dial shown in FIG. 2B gives a nostalgic feeling to the user when performing a dialing operation. Further, when a particular soft key 220 it touched and rotated (slid or dragged) on the touch screen 40 past the stopper 24, the controller 240 outputs a clicking sound via the speaker SPK.

Note that in the arrangement in FIG. 2A, which does not include the rotary dial casing 230 nor the stopper 240, the controller 240 can inform the user the soft key 220 has been entered by controlling the vibrator 70 to vibrate. Further, the user may select the different arrangements shown in FIGS. 2A and 2B (as well as the other figures) using appropriate menu options provided on the terminal 100 (e.g., by selecting particular rotary dial arrangements among a plurality of available rotary dial arrangements).

Hereinafter, the rotary dial arrangement shown in FIG. 2B will be used to explain different features of the present invention. For example, FIG. 3 is an overview of a user touching one of the soft keys 220 in the rotary dial arrangement shown in FIG. 2B.

Figure 3:
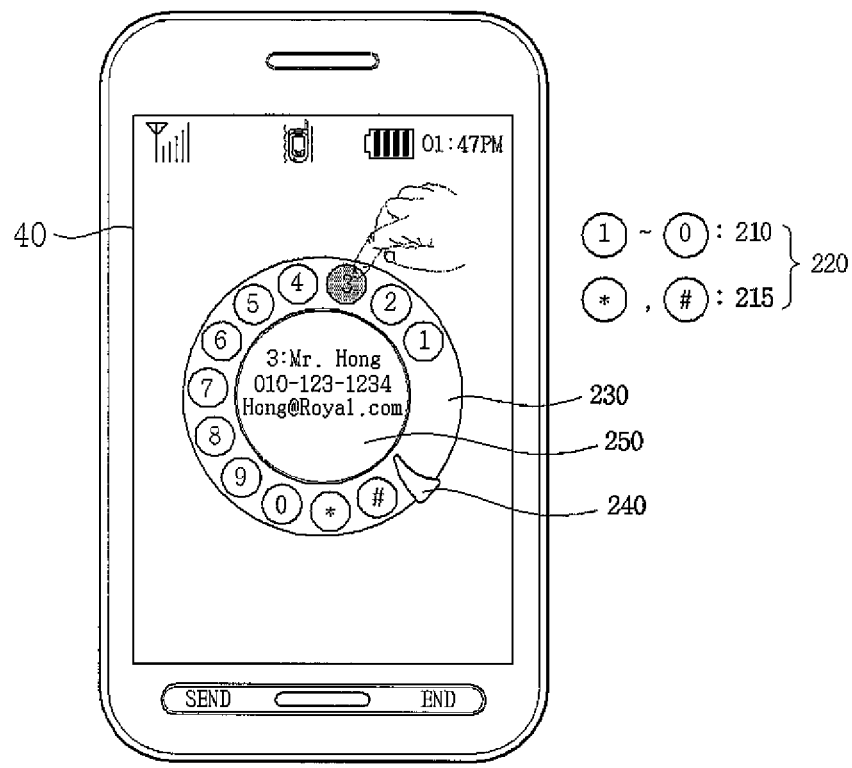
FIG. 3 is an overview illustrating a specific number key being touched by a user according to an embodiment of the present invention.

As shown in FIG. 3, when the user touches the soft key "3", the controller 50 receives the input number "3" corresponding to the touched soft key. Further, FIG. 3 illustrates the user touching the number "3" using his finger, however, the user may also use a stylus pen or any other pointing object. In addition, as shown in FIG. 3, upon receiving the input of the number, the controller 50 displays the number "3" at an inside area 250 of the rotary dial casing 230. Thus, the user can see the number has been successfully input.

Further, when the number "3" has been preset to correspond with particular information, the controller 50 also displays information related to the touched number. FIG. 3 illustrates a name, phone number and email address corresponding to the number "3" that was previously saved in the memory 20. In addition, FIG. 3 illustrates the controller 50 displaying the information related to the touched soft key in the area 250, but the controller 50 can also display this information at any other location on the touch screen 40 (e.g., at lower left or right portions of the touch screen 40).

Figure 4A:
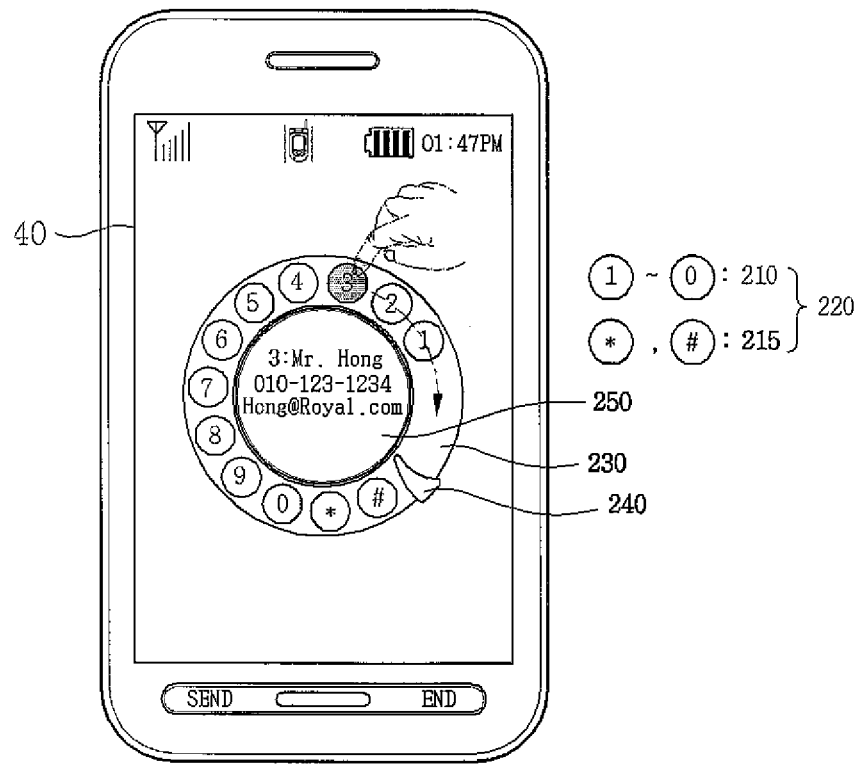
FIGS. 4A-4D are overviews illustrating different stages of a dialing operation being performed on the terminal according to an embodiment of the present invention.
Figure 4B:
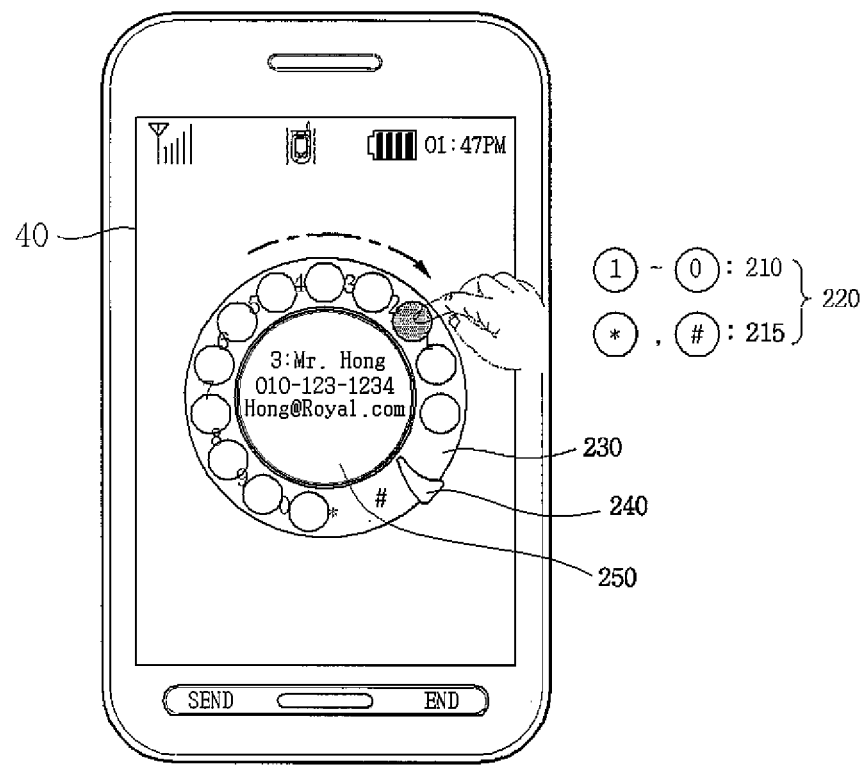

Next, FIGS. 4A-4D are overviews illustrating the soft number key "3" being touched and slid (or dragged) by a user. In more detail, FIG. 4A illustrates the user touching the soft key "3" and beginning to rotate the rotary dial casing 230 in a clockwise direction. FIG. 4B illustrates in more detail the rotary casing 230 being rotated as the user touches and slides the soft key "3" in the clockwise direction. Note that the stopper 240 does not rotate as the user rotates the soft key "3" in the clockwise direction.

Figure 4C:
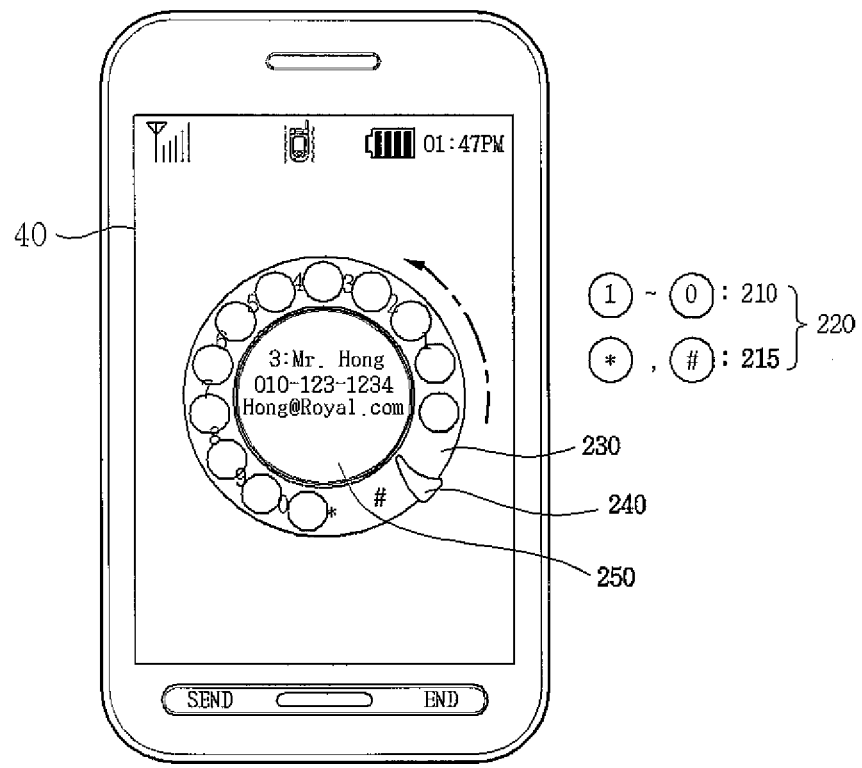
Figure 4D:
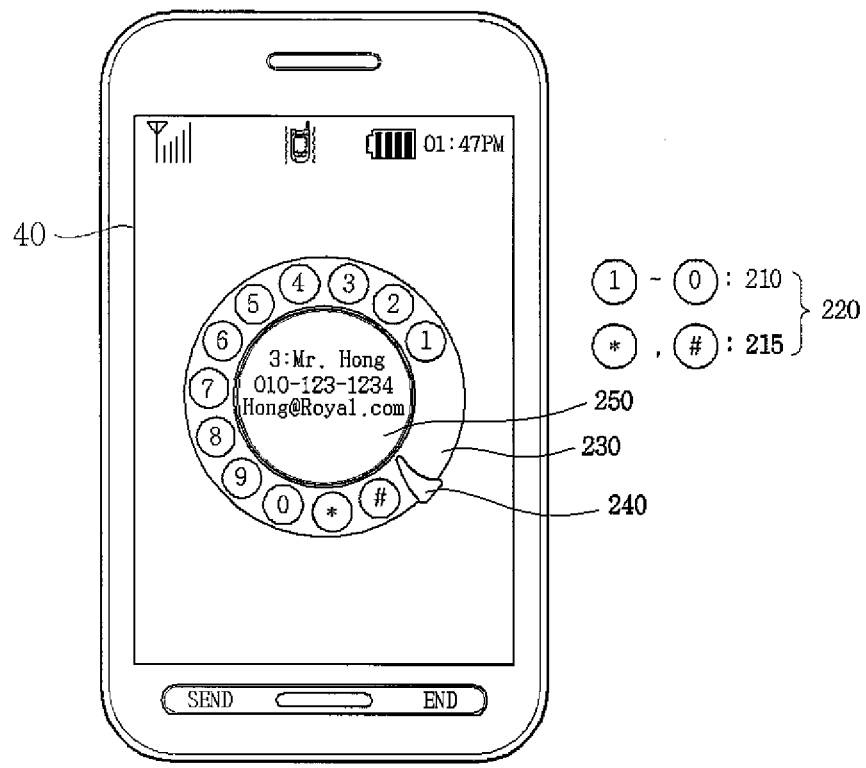

FIG. 4C illustrates the user releasing his finger from the soft key "3" prior to rotating the soft key "3" pass the stopper 240. FIG. 4D illustrates the rotary casing 230 being returned to its original position as in FIG. 4A. Thus, in this instance, because the user did not rotate the soft key "3" pass the stopper 240, the controller 50 does not dial the number shown in the inside area 240. That is, the user would have to rotate the soft key "3" pass the stopper 240 to have the number dialed for the person shown in the inside area 240.

In addition, the speed at which the rotary casing 230 is returned to its original position is preferably faster than the speed at which the user rotates the rotary casing 230 in the clockwise direction. The controller 50 may also output a rotational clicking sound when the rotary casing 230 is returned to its original position to imitate the rotational clicking sound of antique rotary dial telephones. The user may also advantageously set the rotational speed of the rotary dial casing 230 using the appropriate menu options on the terminal.

Next, FIGS. 5A-5E are overviews illustrating different stages of a dialing operation being performed on the terminal according to another embodiment of the present invention. FIGS. 5A-5E are similar to FIGS. 4A-4D, except that the user touches the soft key "3" and rotates the soft key "3" all the way to the stopper 240, thus entering the command to perform a dialing operation of the number displayed in the inside area 250.

Figure 5A:
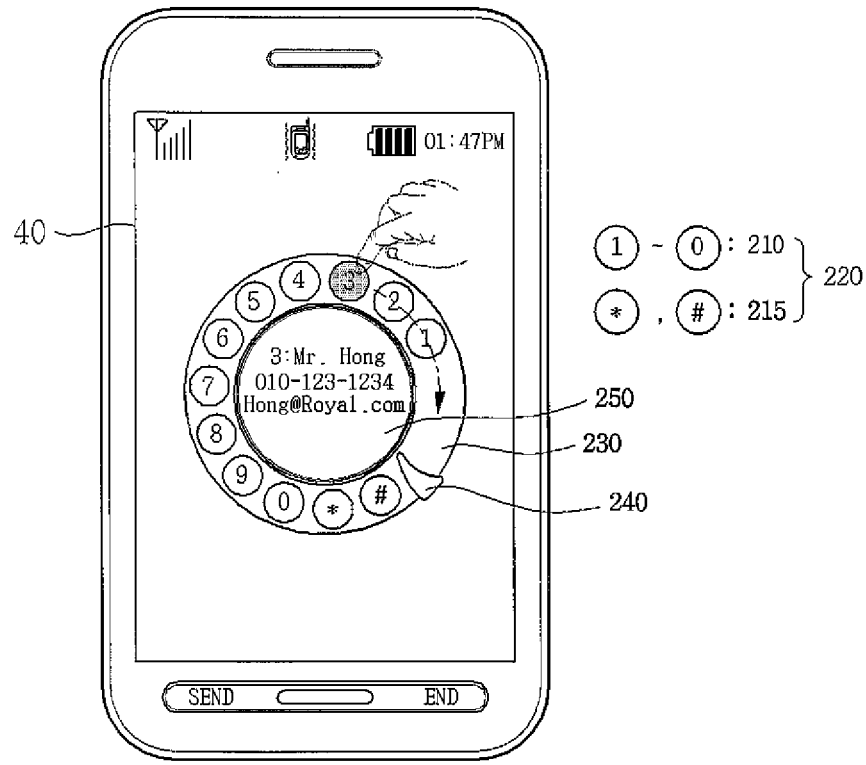
FIGS. 5A-5E are overviews illustrating different stages of a dialing operation being performed on the terminal according to another embodiment of the present invention.
Figure 5B:
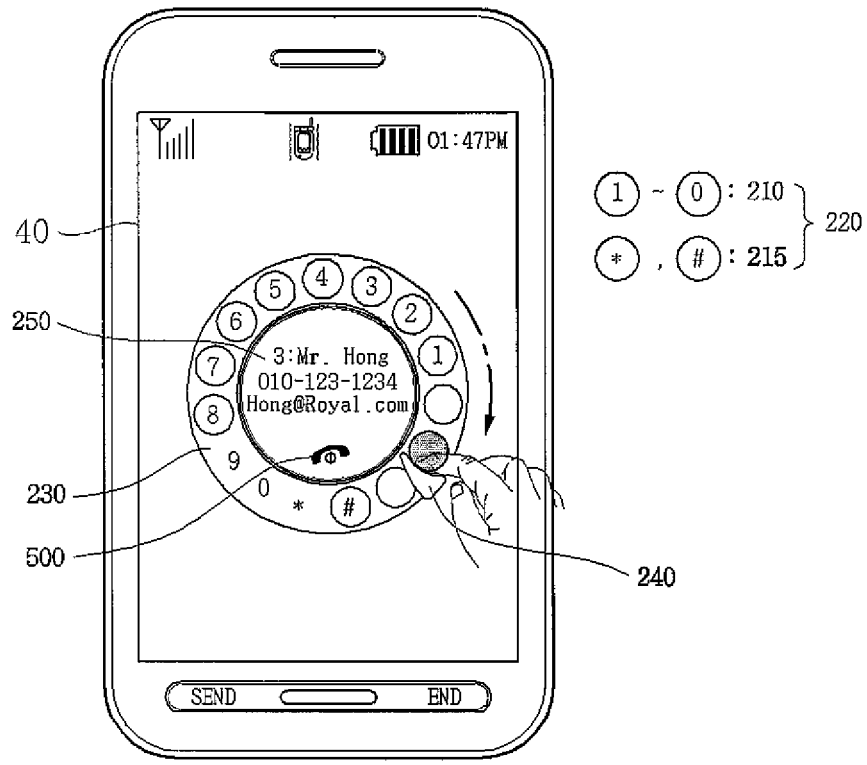

In more detail, as shown in FIG. 5A, the user first touches the soft key "3" and slides the key "3" clockwise towards the stopper 240. Note that similar to FIG. 4, the information related to the soft key "3" (which is previously stored in the memory 20) is displayed in the inside area 250. As shown in FIG. 5B, the user slides the soft key "3" to the stopper 240. Therefore, the controller 50 performs a dialing operation using the information displayed in the inside area 250. The controller 50 also displays an icon 500 to inform the user the dialing operation is being performed. As discussed above, the controller 50 may also output a clicking sound to inform the user he or she has slid the soft key to the stopper 240.

Alternatively, if the soft key "3" was not previously set as a speed dial key, the controller 50 would enter the number 3 as part of a number to be dialed. Further, as shown in the FIG. 5A, the further the soft key is away from the stopper 240, the more distance the user must slide the soft key.

Figure 5C:
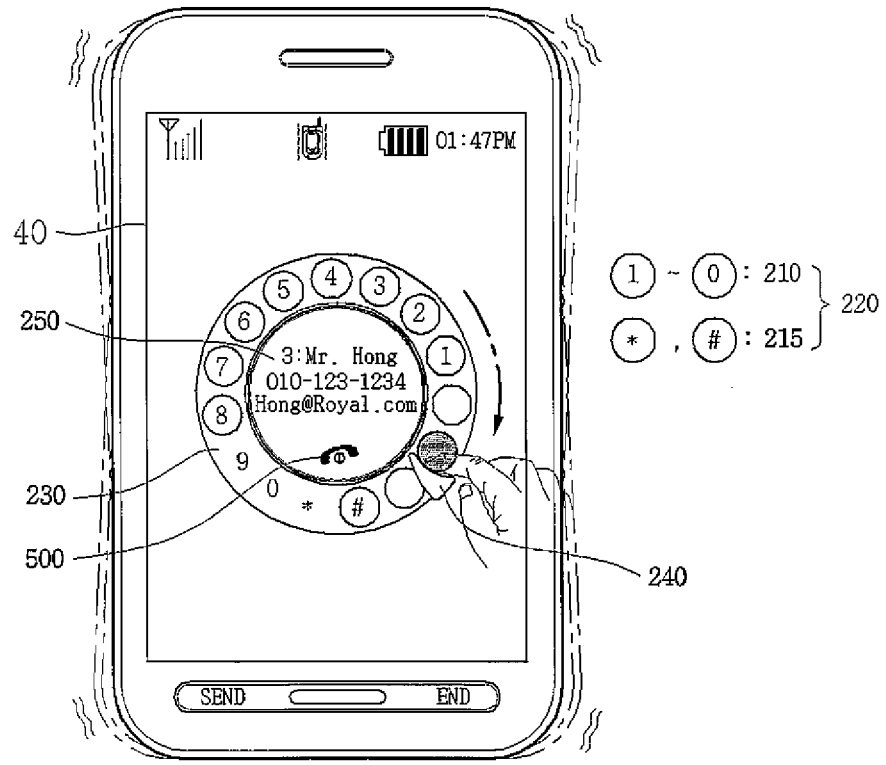

FIG. 5C is similar to FIG. 5B, except that the controller 50 controls the vibrator 70 to vibrate when the user slides the soft key "3" to the position of the stopper 240 to inform the user that the soft key "3" has been successfully input. The controller 50 may also control the audio processor 60 to output a specific sound such as a ring tone. In addition, the intensity of the vibration or the type and volume of the ring tone may be advantageously set by the user using the appropriate menu options on the terminal.

Figure 5D:
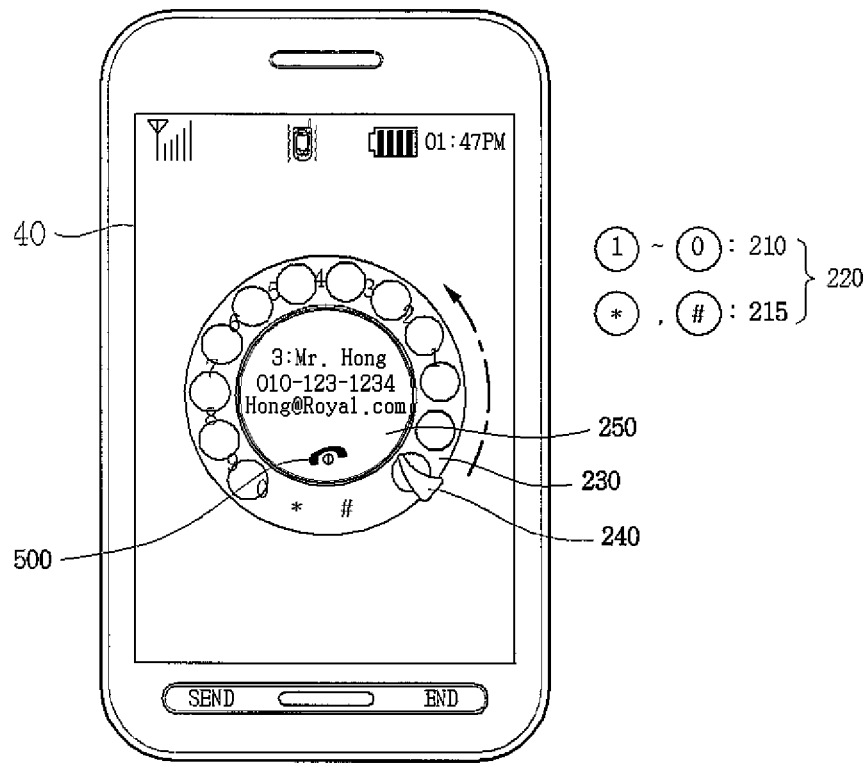
Figure 5E:
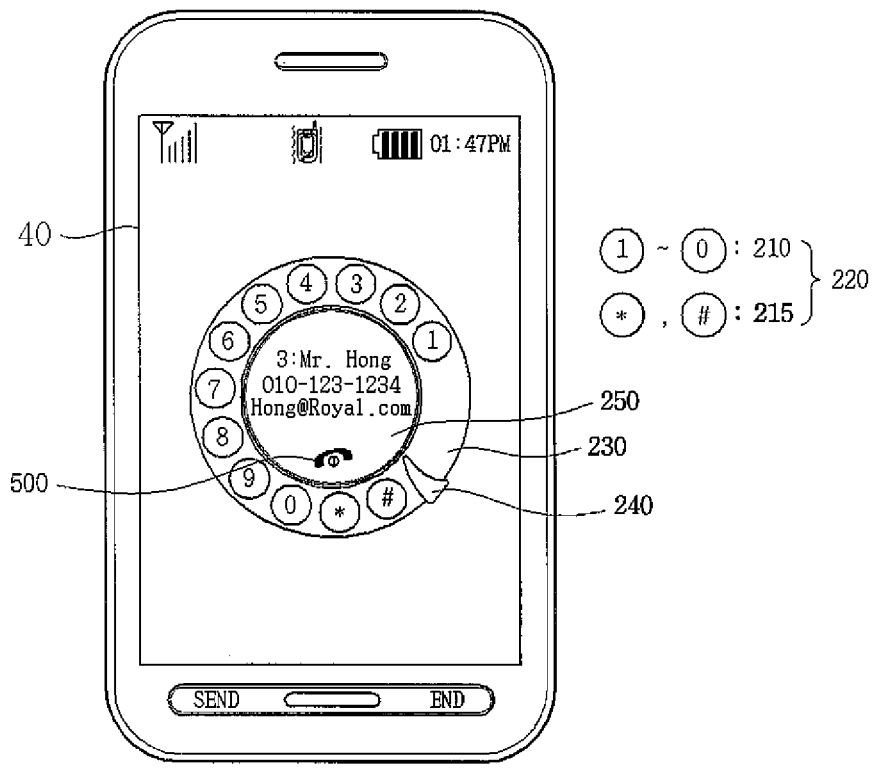

FIG. 5D illustrates the user releasing the soft key "3" and the rotary casing 230 rotating counterclockwise back to its original position. FIG. 5E illustrates the rotary casing 230 being in its original position. As discussed previously with respect to FIG. 4, the rotary casing 230 preferably rotates back to its original position at a faster speed than the user rotates rotary casing 230 clockwise when dialing. The speed of the counterclockwise rotation of the rotary casing 230 may also be set by the user.

Figure 6:
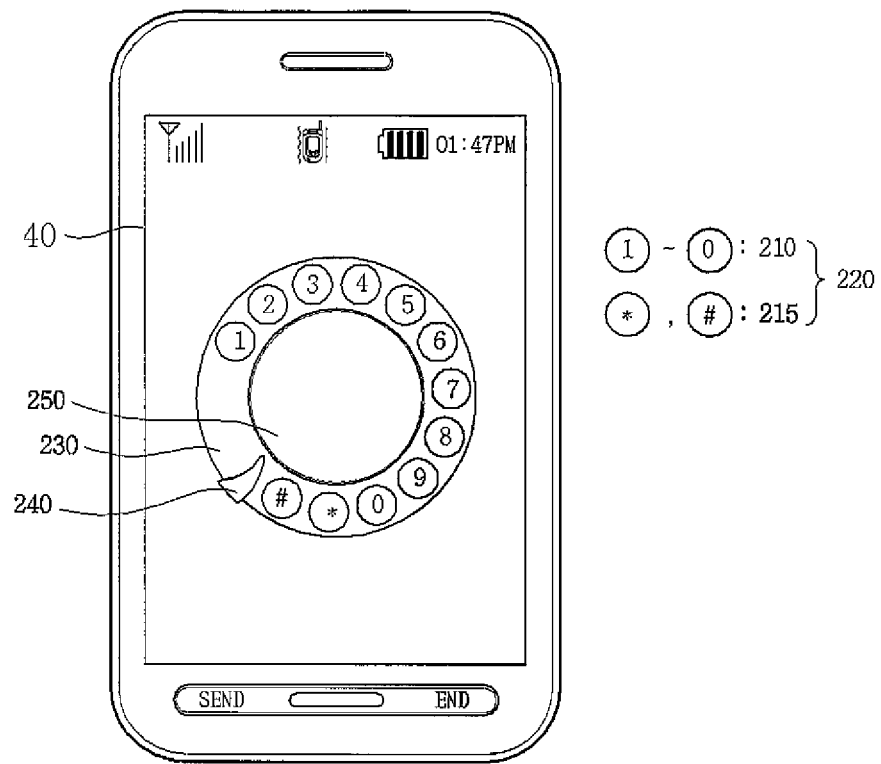
FIG. 6 is an overview illustrating an inverted rotary dial according to an embodiment of the present invention.

Further, the speed of the counterclockwise rotation may be faster for soft keys that are farther away from the stopper. For example, the counterclockwise speed of the rotary casing 230 may be faster when the user dials the soft key "8" than when the user dials the soft key "3". In addition, the arrangement of the soft keys shown in the figures is only an example, and the arrangement of the soft keys may be inverted from that shown in the figures. For example, FIG. 6 illustrates such an inverted arrangement of the soft keys. The different arrangements of the soft keys may also be selected by the user using the appropriate menu options on the terminal. In FIG. 6, the user would touch a particular soft key and rotate the rotary casing 230 in a counterclockwise direction to the stopper 240 to initiate a call to a phone number matched to the touched soft key.

As described above, the rotary dial casing 230 is rotated while the soft key is touched toward the stopper 240. However, rather than the whole casing including all the soft keys being rotated, it is also possible that only the touched soft key is displayed as being rotated when the user touches and slides the soft key. FIGS. 7A-7D illustrate this concept.

Figure 7A:
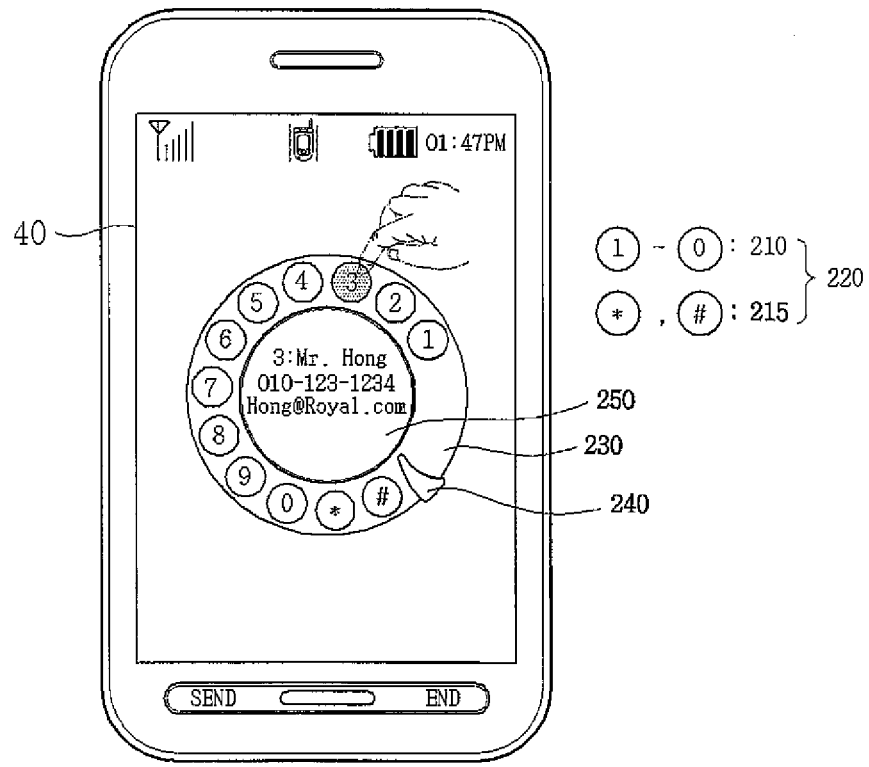
FIGS. 7A-7D are overviews illustrating different stages of a dialing operation being performed on the terminal according to still another embodiment of the present invention.
Figure 7B:
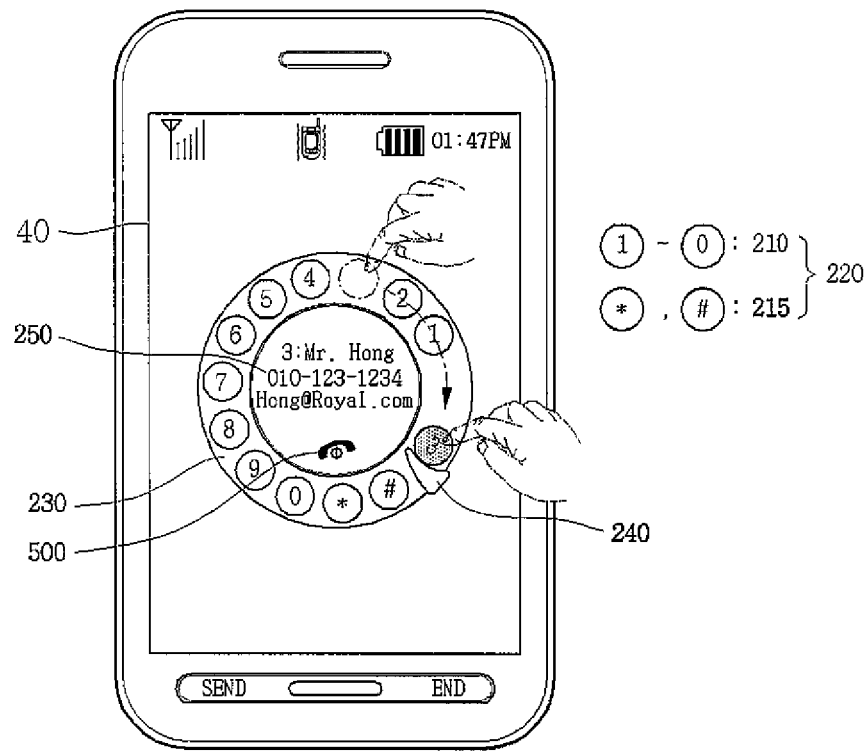
Figure 7C:
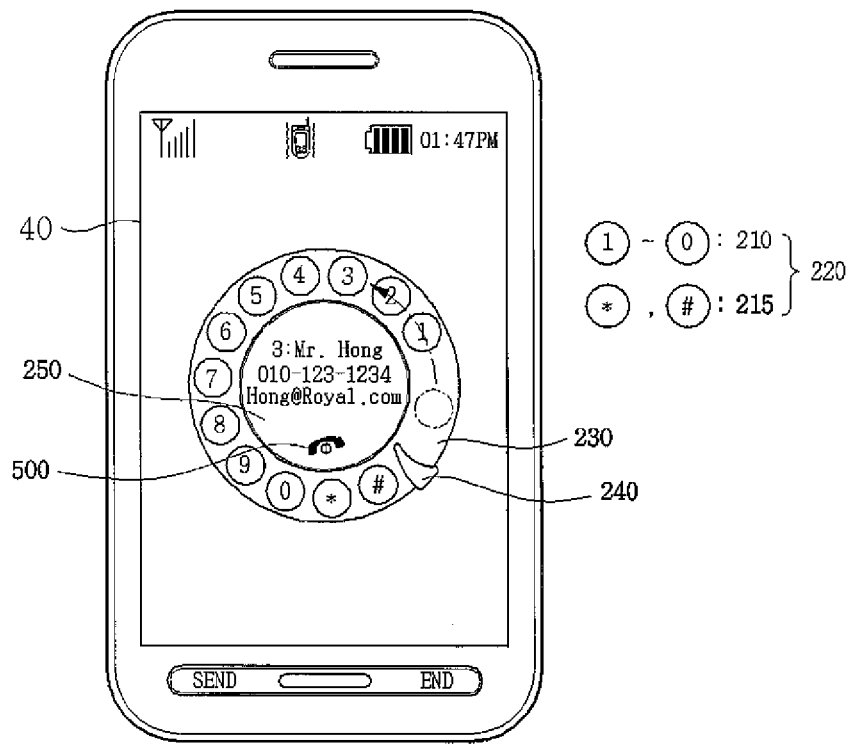
Figure 7D:
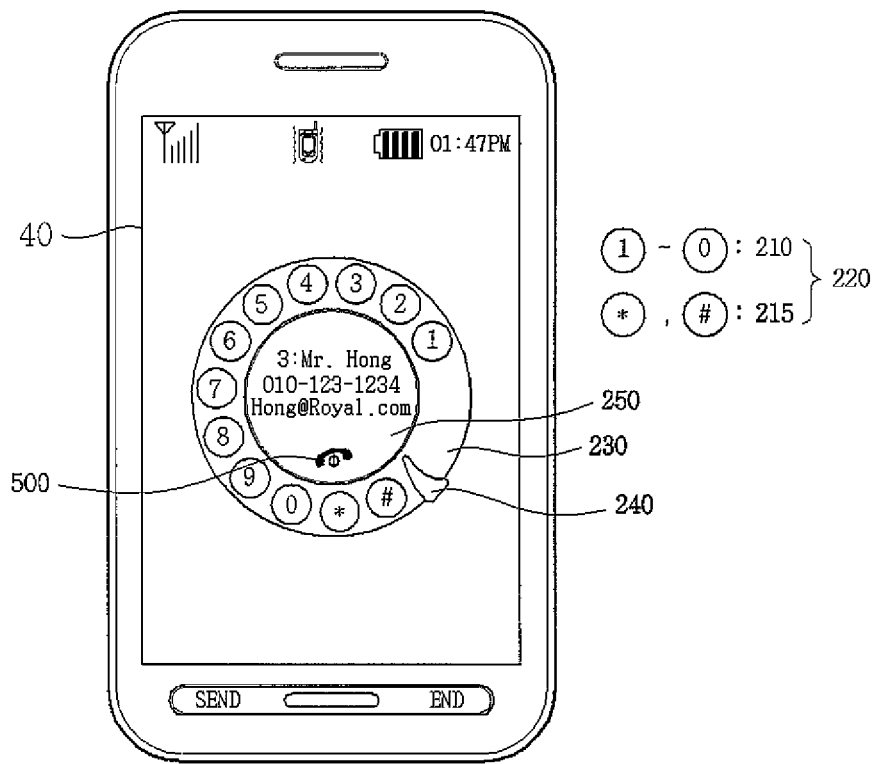

In more detail, FIG. 7A illustrates the user touching the soft key "3" and FIG. 7B illustrates the user rotating the soft key "3" clockwise towards the stopper 240. Note that only the soft key "3" is rotated and the other soft keys on the rotary dial casing are not rotated. FIGS. 7C and 7D illustrate the user releasing the soft key "3" and the soft key "3" being rotated counterclockwise back to it original position. Further, rather than displaying the soft key "3" being rotated in the counterclockwise direction in FIG. 7C, it is also possible to make the soft key "3" disappear from the screen when the user releases the soft key, and then reappear at its original position.

Figure 8A:
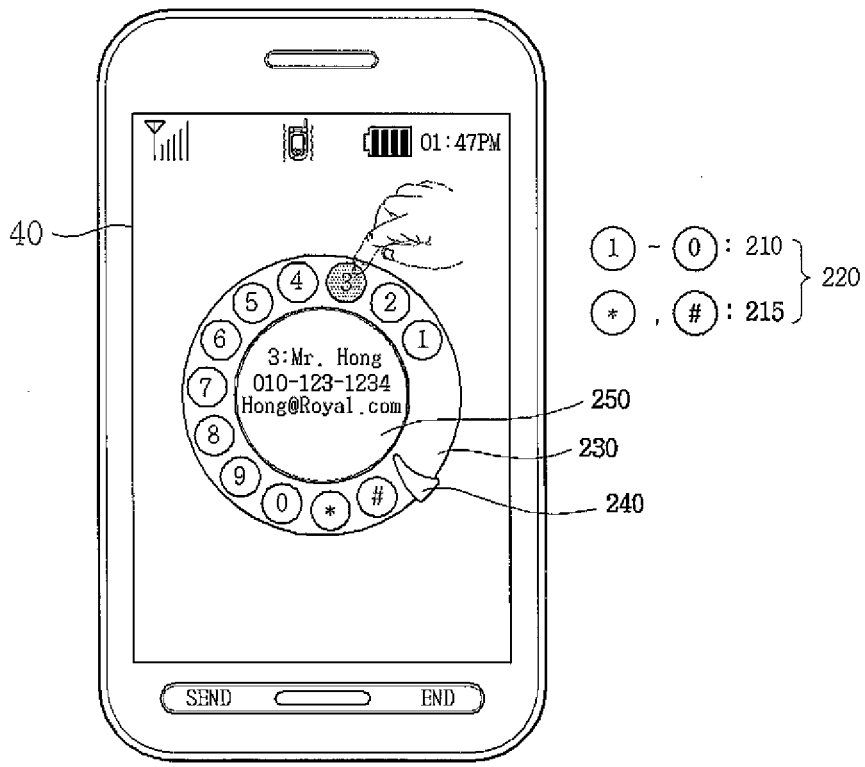
FIGS. 8A-8D are overviews illustrating different stages of a dialing operation being performed on the terminal according to yet another embodiment of the present invention.
Figure 8B:
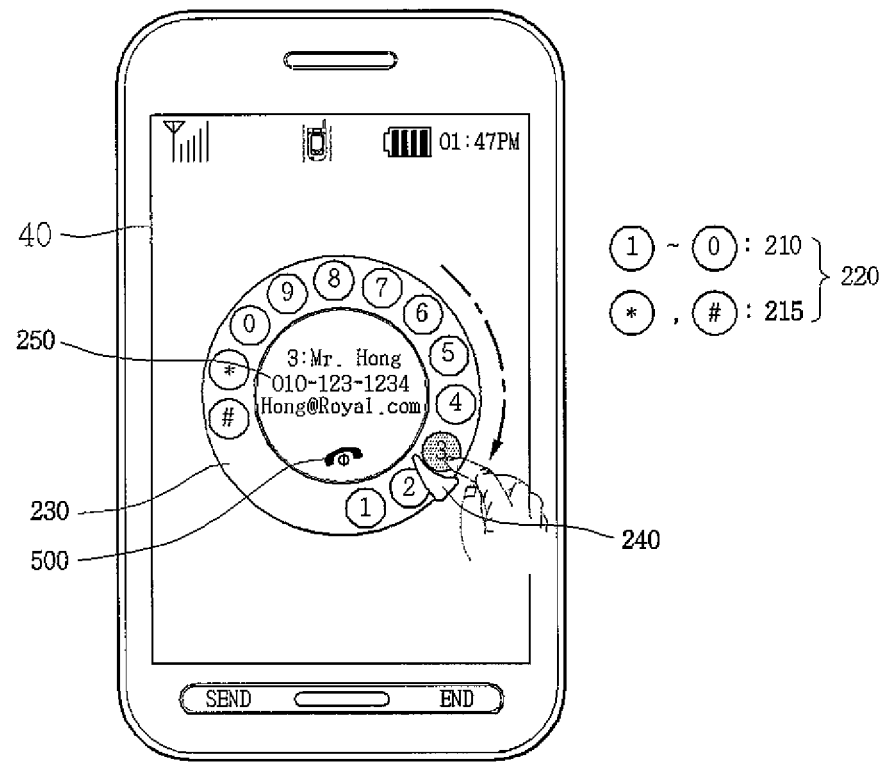
Figure 8C:
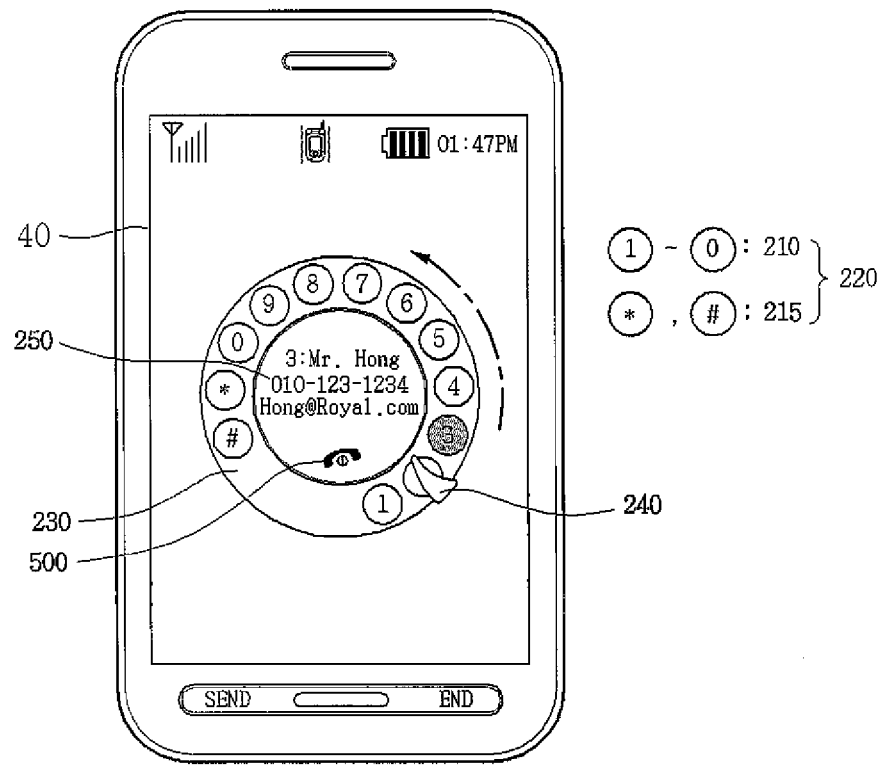
Figure 8D:
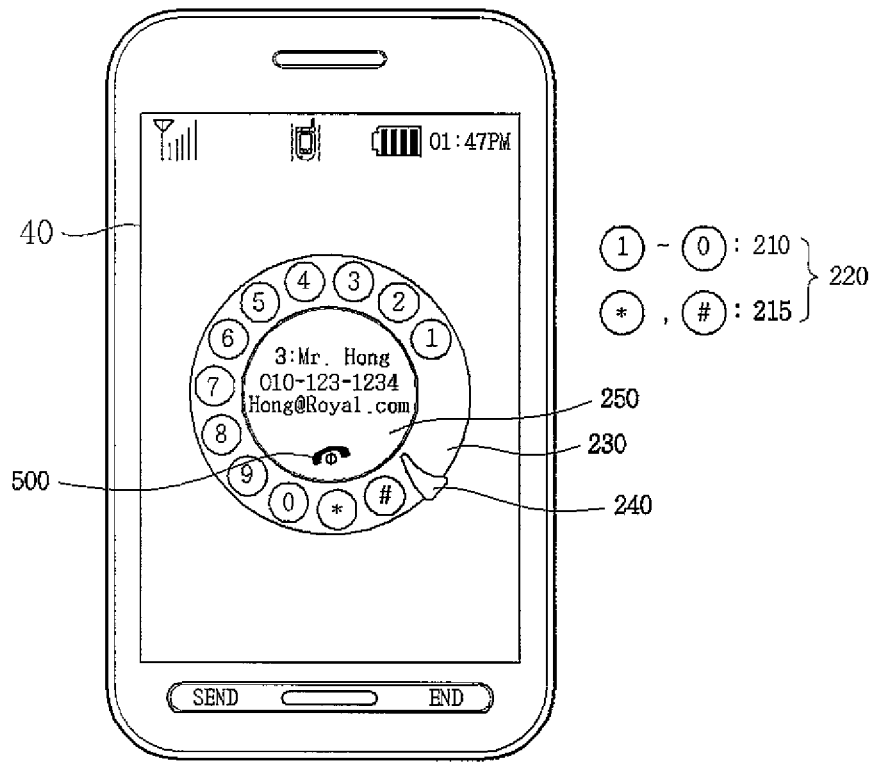

Next, FIGS. 8A-8D illustrate all soft keys being rotated together with the touched and rotated (slide) soft key "3". That is, FIG. 8A illustrates the user touching the soft key "3" and FIG. 8B illustrates the user sliding (rotating) the soft key "3" in the clockwise direction to the stopper 240. As shown in FIG. 8B, all of the other soft keys (e.g., the soft keys "4", "5", "6", etc.) are also rotated together with the soft key "3". FIG. 8C illustrates the user releasing the soft key "3" and FIG. 8D illustrates the soft key "3" being returned to its original position.

A description of entering more than one number on terminal will now be given. As described with reference to FIGS. 3-4D, when the user touches and slides one of the soft keys 210 and release the touched soft key 210 before reaching the stopper 240, the controller 50 receives the number input corresponding to the touched number key, but does not perform the dialing operation. Thus, the user may continue to select additional soft keys 210 to enter more than one number. FIGS. 9A-9E illustrate these features.

Figure 9A:
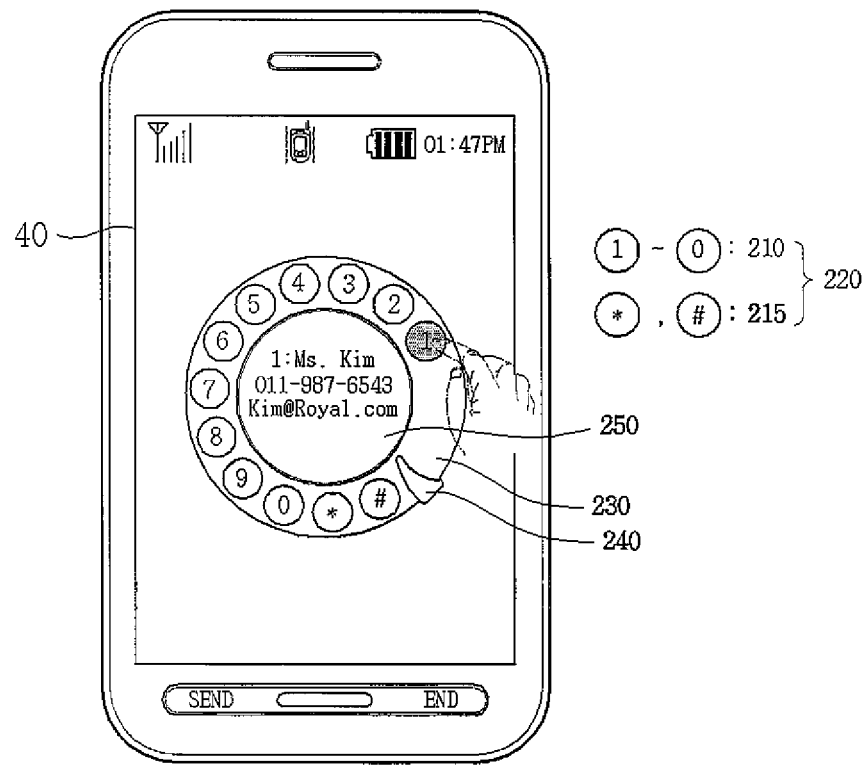
FIGS. 9A-9E are overviews illustrating different stages of a dialing operation and a call being connected according to an embodiment of the present invention.

In more detail, in FIGS. 9A-9E, it is assumed the user wants to dial a number that has been previously associated with the speed dial number "15". Therefore, as shown in FIG. 9A, the user first touches the soft key "1" and the address information related to the speed dial key "1" is displayed in the inside area 250. Note that it is possible to configure the controller 50 to receive the number corresponding to the touched key when the user merely touches the key, or alternatively, only when the user touches and slides the soft key (without actually sliding the touched soft key to the position of the stopper 240).

Figure 9B:
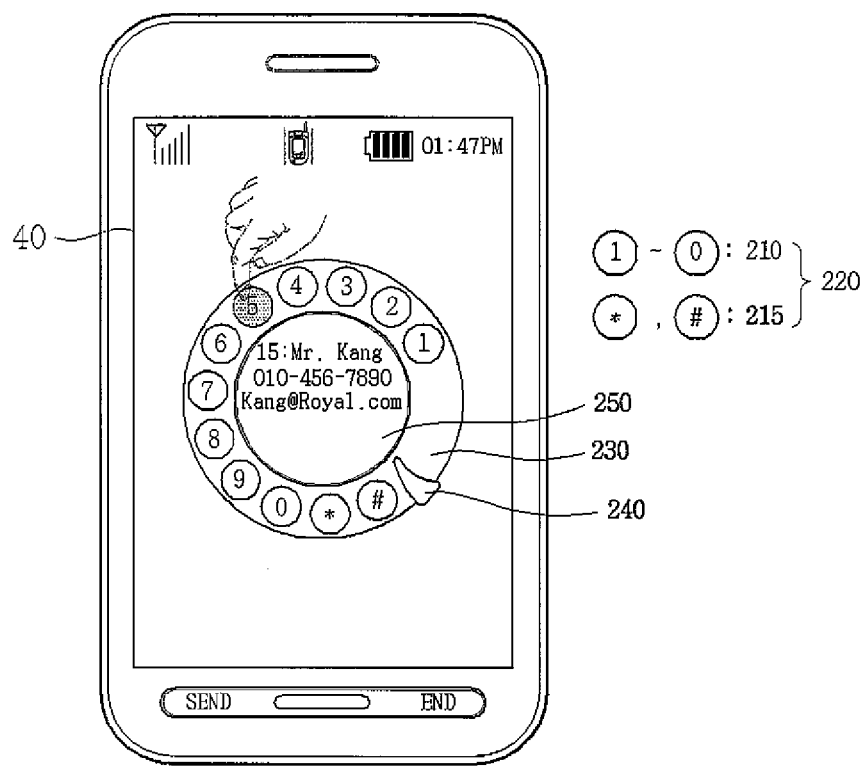
Figure 9C:
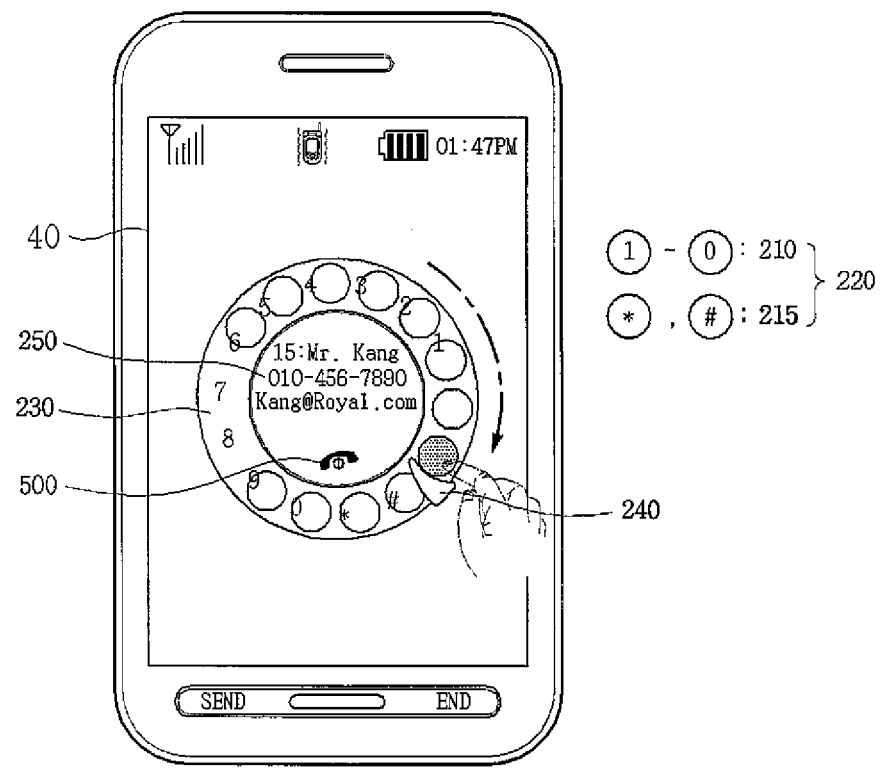
Figure 9D:
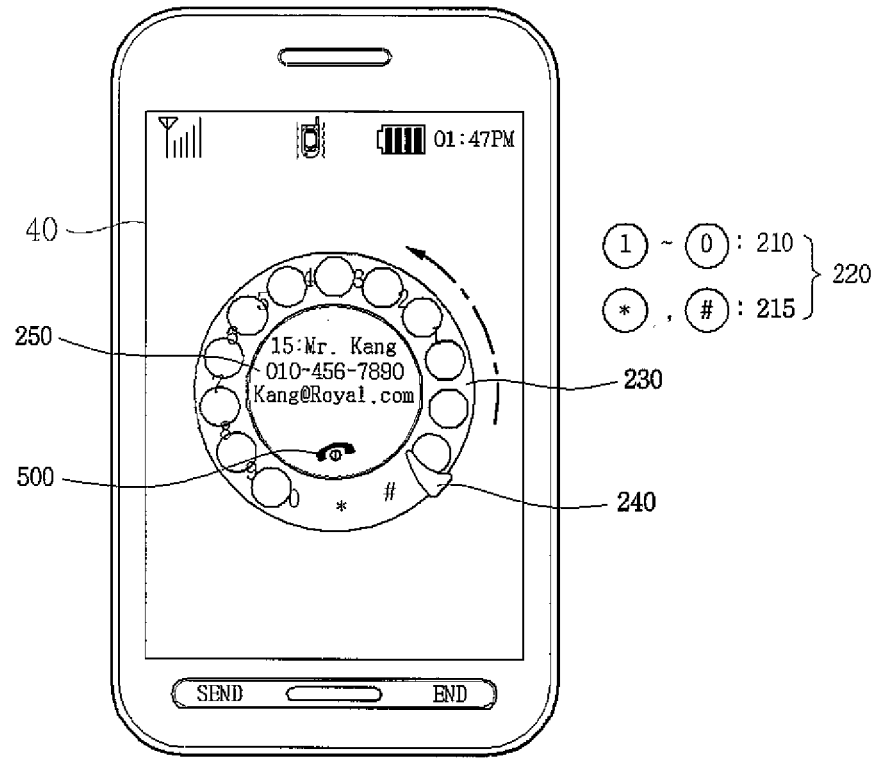
Figure 9E:
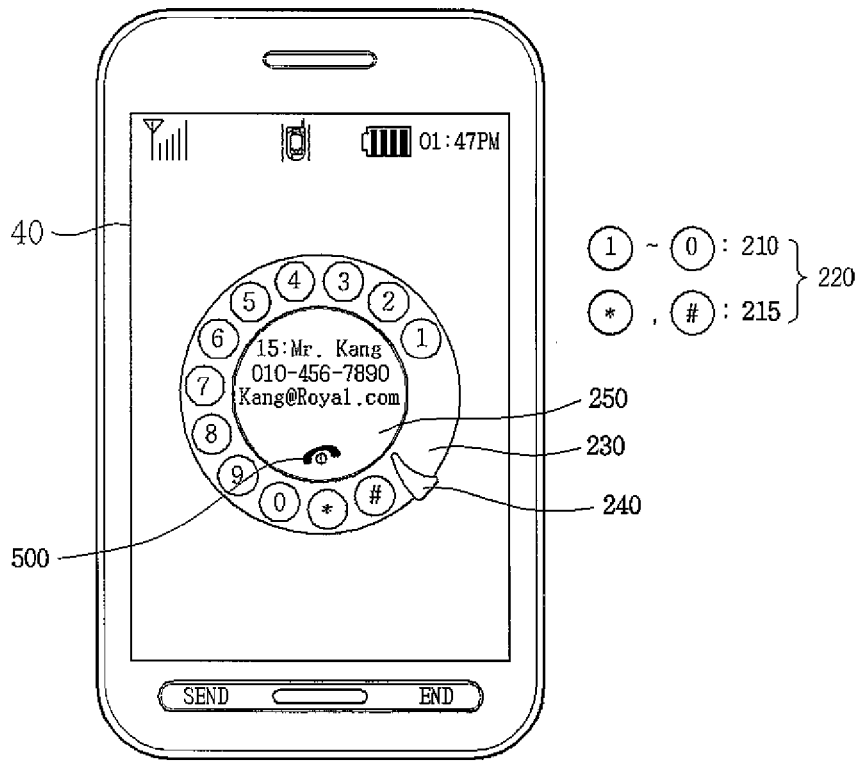

Then, as shown in FIG. 9B, the user touches the soft key "5", and the address information corresponding to the speed dial key "15" is displayed in the inside area 250. Then, shown in FIG. 9C, the user rotates the soft key "5" to the position of the stopper 240, and the controller 50 performs the dialing operation for the speed dial key "15". The controller 50 also displays an icon 500 to inform the user that the dialing operation has been performed. FIGS. 9D and 9E illustrate the user releasing the soft key "15" and the soft key "15" being returned to its original position.

Further, the user can also enter a telephone number that is not stored in the memory 20 in a similar manner. For example, if the user wants to dial the phone number "202-888-1234", the user may sequentially input the numbers "2028881234" and slide the last number "4" to the stopper 240 to have the dialing operation performed. As the numbers are selected, the controller 50 displays each number in the inside area 250 so the user can see that the correct numbers have been successfully input. Alternatively, if the user does not touch any of the soft keys 210 for a predetermined amount of time after inputting the above numbers repeatedly, the controller 50 can perform a dialing operation for all numbers that have so far been input.

Figure 10A:
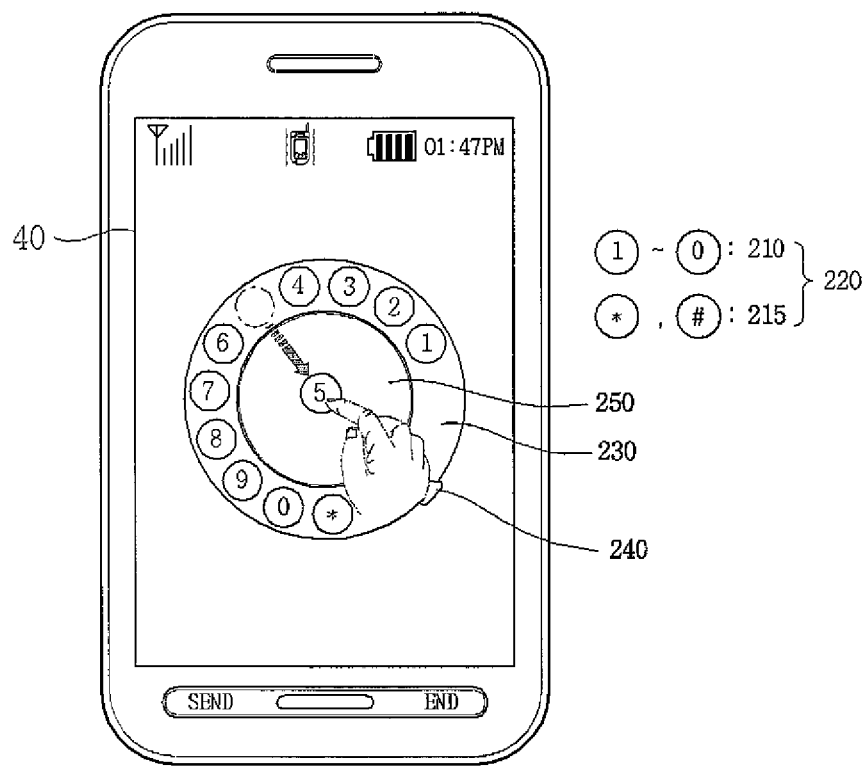
FIGS. 10A and 10B are overviews illustrating a user invoking a message function using a rotary dial according to an embodiment of the present invention screens.
Figure 10B:
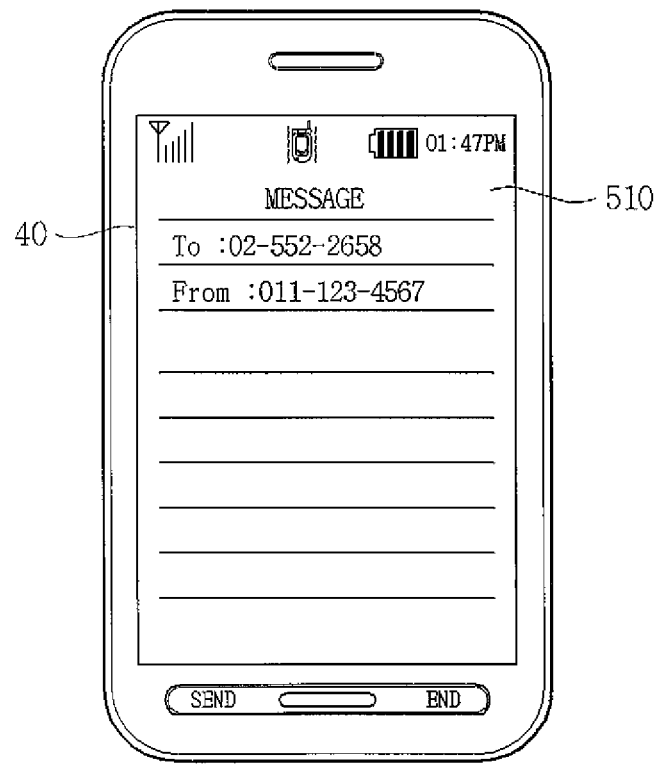

In the above descriptions, the number keys 210 are touched and slid along the direction of the rotary casing 230. However, it is also possible that the number keys 210 be touched and slid into the inside area 250 of the rotary dial casing 230 to execute various functions. FIGS. 10A and 10B illustrate these features.

Note also that FIGS. 10A and 10B illustrate a method of executing a message editor rather than a dialing operation as in the other embodiments. In more detail, FIG. 10A, illustrates the user touching and sliding (or dragging) the soft key "5" into the inside area 250 of the rotary dial casing 230 to execute the message editor.

Then, as shown in FIG. 10B, the controller 50 displays an editor screen 510 on the touch screen 40 that allows the user to create and edit a message. For example, as shown in FIG.

10B, the controller 50 displays the information stored in the memory corresponding to the speed dial key "5". Thus, the user can edit or change the information as necessary. Thus, the user can easily invoke the message editor by touching and sliding a particular soft key. Alternatively, in another embodiment, the user can touch a particular soft key and slide the soft key to an area outside of the rotary dial casing 230 to display the editor screen 510.

Figure 11A:
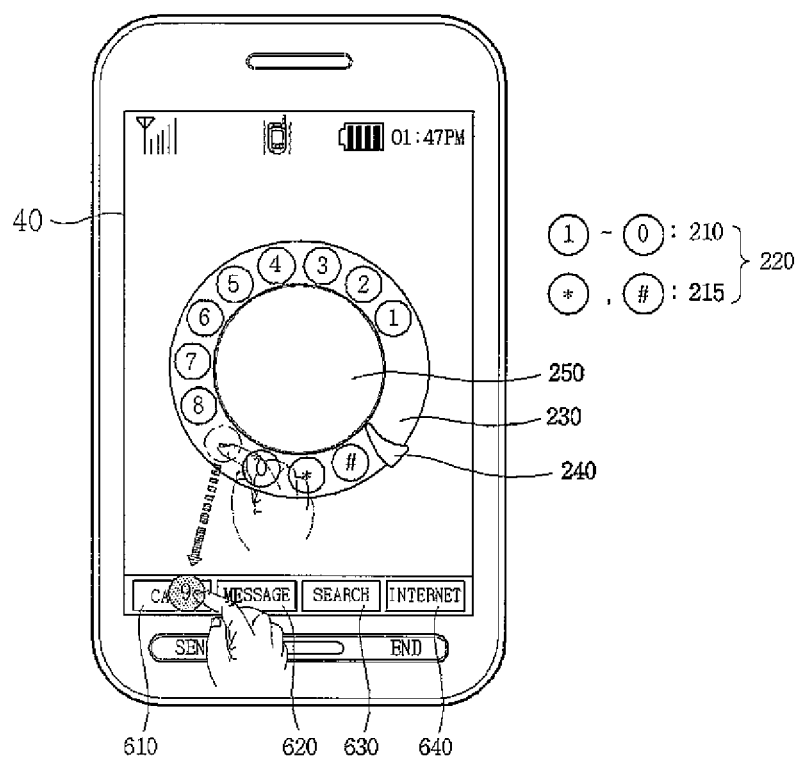
FIGS. 11A and 11B are overviews illustrating a user invoking a menu option using a rotary dial according to an embodiment of the present invention
Figure 11B:
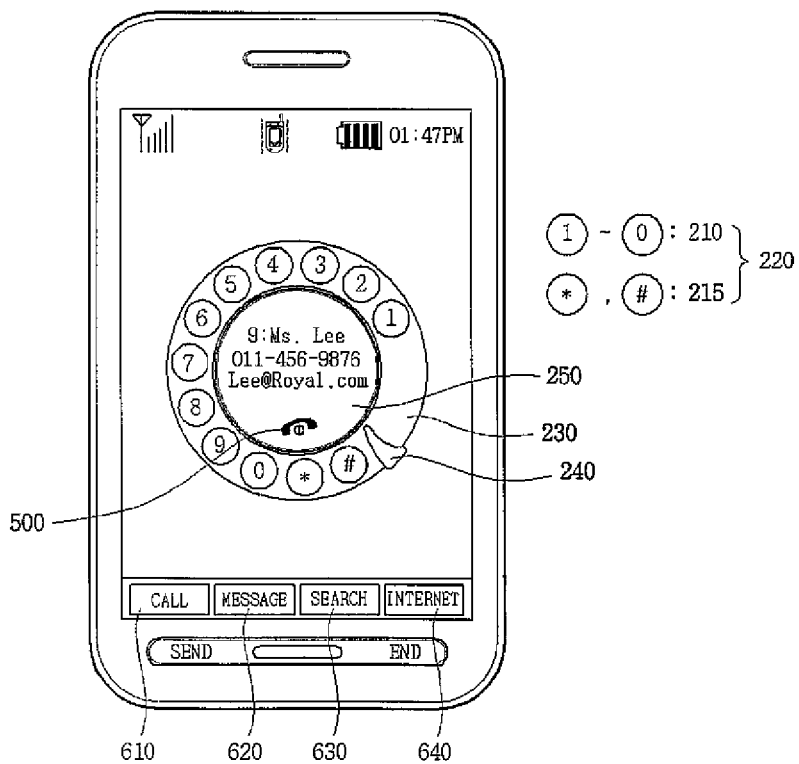

Next, FIGS. 11A and 11B illustrate the user touching a particular soft key and sliding the soft key into or towards a menu icon displayed at the touch screen 40 to execute a specific function. That is, as shown in FIGS. 11A and 11B, the controller 50 displays a plurality of menus (e.g., Call menu 610, Message menu 620, Search menu 630 and Internet menu 640) on the touch screen 40. Then, as shown in FIG. 11A, the user touches the soft key "9" and slides the soft key "9" toward the Call menu 610.

When the user releases or drops the soft key "9" in the Call menu 610, the controller 50 initiates a call corresponding to a phone number associated with the speed dial number "9". Similarly, if the user drags and drops the soft key "9" onto the message menu 620, an editor screen may be displayed for editing the information corresponding to speed dial number "9".

Further, if the user drags and drops the soft key "9" onto the search menu 630, the controller 50 displays a search engine (such as GOOGLE) allowing the user to search for information on the Internet. The search function may also be a search window allowing the user to search files in a folder associated with the soft key "9". The user may also advantageously associated each number with a different searching function (e.g., the soft key "9" corresponds the GOOGLE search, the soft key "8" corresponds to a file search on the terminal, etc).

In addition, if the user drags and drops the touched number key "9" onto the Internet connection menu 640, the controller 50 displays a website that corresponds to the particular soft key "9". That is, the user may associate soft keys with favorite or particular web pages such that when the soft key is slid and dropped into the Internet menu 640, the appropriate web page is displayed on the touch screen 40. Further, the call menu 610, the message menu 620, the search menu 630, and the Internet menu 640 may be represented by specific icons to provide short cuts to execute the corresponding functions.

In the above-described embodiments, the stopper 240 is used as a reference point to determine whether or not to perform a dialing operation. However, in another embodiment, the reference point or threshold in which the dialing operation is to be performed may be set according to how far a distance one of the soft keys is slid. For example, the controller 50 may initiate a dialing operation when a soft key is slid past a predetermined threshold (a particular distance).

Further, if the touch keys are slid less than the predetermined threshold (distance), the controller 50 merely receives an input number corresponding to the touched number key, but does not execute the dialing operation. Further, in this embodiment, the slid direction of the touch key does not have to follow the circle of the rotary dial casing 230, and the direction may vary. That is, the sliding direction may be any other direction such as inward direction or outward direction of the rotary dial casing 230.

In yet another embodiment, the threshold in which a function such as the dialing operation is to be performed may be set according to how long a time lapse after the last one of the soft keys is touched. If none of the soft keys is touched for a predetermined time period after the last one of the soft keys is touched, the controller 50 may receive an input instruction to perform a function corresponding to the touched soft keys.

In yet another embodiment, the amount of time a particular touch key is touched may be used to determine whether the controller 50 performs the dialing operation or merely receives the number corresponding to the touched soft key. That is, a predetermined time period may be set as the threshold to determine the operations of the controller 50. That is, when the touch key is pressed for a time period that is longer than the predetermined time period, the controller 50 executes the corresponding function related to the touched soft key. Similarly, when the soft key is touched for a time period that is less than the threshold, the controller 50 merely receives the number (or character) corresponding to the touched soft key.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile terminal including a touch input device, the method comprising:

displaying a rotary dial including a plurality of soft keys in a circular pattern on a screen of the touch input device;

touch selecting one of the soft keys and sliding the selected soft key along the rotary dial to a rotary stopper displayed on the rotary dial, wherein the rotary dial rotates as the selected soft key is slid to the rotary stopper and the rotary stopper does not rotate as the rotary dial rotates;

displaying the selected soft key as being rotated back to its original displayed position as the selected rotary soft key is released from being touched;

displaying information corresponding to the selected and slid rotary soft key;

executing a function related to the displayed information when none of the soft keys is touch selected for a predetermined period after a last one of the soft keys is touch selected and slid to the rotary stopper, wherein the displayed information is a number or character corresponding to the selected and slid soft key when the selected and slid soft key is not slid into the rotary dial stopper but is released before the rotary dial stopper;

displaying an editor screen for editing a message on the screen of the touch input device, the editor screen comprising an information stored in a memory corresponding to the soft key when the soft key is selected and dragged into an inside area of the rotary dial; and executing a function corresponding to a menu icon associated with the selected soft key when the soft key is selected and dragged to the menu icon displayed on an outside area of the rotary dial, wherein the function related to the displayed information corresponds to a phone dialing function.

2. The method of claim 1, further comprising:

displaying all of the plurality of soft keys as being slid on the screen in concert with the touched and slid soft key.

3. The method of claim 1, further comprising:

displaying only the selected and slid soft key as being slid on the screen and not displaying other soft keys as being slid in concert with the selected and slid soft key.

4. The method of claim 1, further comprising:
generating an alarm signal when the selected and slid soft key is slid to the predetermined position.

5. The method of claim 1, wherein displaying the selected and slid soft key being rotated back to its original position displays the selected and slid soft key being rotated back to its original displayed position with an accelerated speed being previously set by a user.

6. The method of claim 1, further comprising:
determining whether a distance the selected and slid soft key is slid is longer than a predetermined reference,
wherein the executing step executes the function if the determining step determines the selected and slid soft key is slid past the predetermined reference and does not execute the function if the selected and slid soft key is not slid past the predetermined reference.

7. The method of claim 1, wherein the function related to the displayed information further corresponds to one of a message editing function, and an Internet accessing function.

8. The method of claim 1, wherein the executing step executes the function when the selected and slid soft key is slid to a menu option displayed on the screen.

9. The method of claim 1, wherein the menu icon comprises at least one of call menu, message menu, search menu and interne menu.

10. A mobile terminal, comprising:
a touch screen display configured to display a rotary dial including a plurality of soft keys in a circular pattern; and
a controller configured to receive a touch selection signal indicating one of the soft keys has been touched and slid along the rotary dial and to a rotary stopper displayed on the rotary dial, to rotate the rotary dial as the selected soft key is slid to the rotary stopper and not to rotate the rotary stopper as the rotary dial rotates, to display the selected soft key as being rotated back to its original displayed position as the selected rotary soft key is released from being touched, to display information corresponding to the selected and slid rotary soft key, and to execute a function related to the displayed information when none of the soft keys is touch selected for a predetermined period after a last one of the soft keys is touch selected and slid to the rotary stopper,
wherein the displayed information is a number or character corresponding to the selected and slid soft key when the selected and slid soft key is not slid into the rotary dial stopper but is released before the rotary dial stopper,
wherein the function related to the displayed information corresponds to a phone dialing function, and
wherein the controller is further configured to:
display an editor screen for editing a message on the screen of the touch input device, the editor screen comprising an information stored in a memory corresponding to the soft key when the soft key is selected and dragged into an inside area of the rotary dial; and
execute a function corresponding to the menu icon associated with the selected soft key when the soft key is selected and dragged to the menu icon displayed on an outside area of the rotary dial.

11. The mobile terminal of claim 10, wherein the controller is further configured to control the touch screen display to display all of the plurality of soft keys as being slid on the screen in concert with the selected and slid soft key.

12. The mobile terminal of claim 10, wherein the controller is further configured to control the touch screen display to display only the selected and slid soft key as being slid on the touch screen display and not displaying other soft keys as being slid in concert with the selected and slid soft key.

13. The mobile terminal of claim 10, wherein the controller is further configured to generate an alarm signal when the selected and slid soft key is slid to the predetermined position.

14. The mobile terminal of claim 10, wherein the controller is further configured to control the touch screen display to display the selected and slid soft key being rotated back to its original position with an accelerated speed being previously set by a user.

15. The mobile terminal of claim 10, wherein the controller is further configured to determine whether a distance the selected and slid soft key is slid is longer than a predetermined reference, and to execute the function if the controller determines the selected and slid soft key is slid past the predetermined reference and does not execute the function if the selected and slid soft key is not slid past the predetermined reference.

16. The mobile terminal of claim 10, wherein the function related to the displayed information further corresponds to one of a message editing function, and an Internet accessing function.

17. The mobile terminal of claim 10, wherein the controller is further configured to execute the function when the selected and slid soft key is slid to a menu option displayed on the touch screen display.

18. A method of controlling a mobile terminal including a touch input device, the method comprising:
displaying an arc-shaped region including a first soft key corresponding to a first function and a second soft key according to a second function; touch selecting one of the first soft key or the second soft key;
displaying information corresponding to the selected first key or second key;
dragging the selected soft key along the arc-shaped region toward a predetermined position on the arc-shaped region, wherein the predetermined position exists between the first soft key and the second soft key;
executing the function corresponding to the selected soft key when the dragging operation is sensed and the selected soft key is slid past the predetermined position, wherein the displayed information is a number or character corresponding to the selected and slid soft key when the selected and slid soft key is not slid into the rotary dial stopper but is released before the rotary dial stopper;
displaying an editor screen for editing a message on the screen of the touch input device, the editor screen comprising an information stored in a memory corresponding to the soft key when the soft key is selected and dragged into an inside area of the rotary dial; and
executing a function corresponding to the menu icon associated with the selected soft key when the soft key is selected and dragged to the menu icon displayed on an outside area of the rotary dial,
wherein the function corresponding to the selected soft key corresponds to a phone dialing function.

19. A mobile terminal, comprising:
a touch input device configured to display an arc-shaped region including a first soft key corresponding to a first function and a second soft key according to a second function; and
a controller configured to receive a touch selecting signal indicating one of the first soft key or the second soft key has been touch selected and dragged toward a predetermined position on the arc-shaped region, to display the touch selected key as moving toward the predetermined position on the arc-shaped region based on the received touch selecting signal, to display information corresponding to the touch selected key; wherein the predetermined position exists between the first soft key and the second soft key, and to execute the function corresponding to the selected soft key when the dragging operation is sensed and the selected soft key is slid past the predetermined position, wherein the displayed information is a number or character corresponding to the selected and slid soft key when the selected and slid soft key is not slid into the rotary dial stopper but is released before the rotary dial stopper, wherein the function corresponding to the selected soft key corresponds to a phone dialing function, and wherein the controller is further configured to:
- display an editor screen for editing a message on the screen of the touch input device, the editor screen comprising an information stored in a memory corresponding to the soft key when the soft key is selected and dragged into an inside area of the rotary dial; and
- execute a function corresponding to the menu icon associated with the selected soft key when the soft key is selected and dragged to the menu icon displayed on an outside area of the rotary dial.

* * * * *